(12) United States Patent
Mahajan et al.

(10) Patent No.: US 8,286,036 B2
(45) Date of Patent: Oct. 9, 2012

(54) OBJECTIVE ASSESSMENT OF APPLICATION CRASHES FROM A CUSTOMER ENVIRONMENT

(75) Inventors: Dhananjay Madhusudan Mahajan, Sammamish, WA (US); John Leo Ellis, Sammamish, WA (US); Ram P. Papatla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 6 days.

(21) Appl. No.: 13/088,829

(22) Filed: Apr. 18, 2011

(65) Prior Publication Data

US 2011/0197099 A1  Aug. 11, 2011

Related U.S. Application Data

(63) Continuation of application No. 11/623,267, filed on Jan. 15, 2007, now Pat. No. 7,954,008.

(51) Int. Cl.
*G06F 11/00* (2006.01)
*G06F 11/34* (2006.01)

(52) U.S. Cl. .......... 714/57; 714/45; 714/46; 714/48

(58) Field of Classification Search .......... 714/45, 714/46, 57, 48
See application file for complete search history.

(56) References Cited

U.S. PATENT DOCUMENTS

| | | | |
|---|---|---|---|
| 5,301,320 A | 4/1994 | McAtee et al. | |
| 5,438,508 A | 8/1995 | Wyman | |
| 5,819,028 A * | 10/1998 | Manghirmalani et al. | 714/57 |
| 6,028,997 A | 2/2000 | Leymann et al. | |
| 6,098,179 A | 8/2000 | Harter, Jr. | |
| 6,708,333 B1 | 3/2004 | Glerum et al. | |
| 6,718,490 B1 * | 4/2004 | Takemoto et al. | 714/47.1 |
| 6,754,854 B2 | 6/2004 | Kurrasch | |
| 6,792,460 B2 * | 9/2004 | Oulu et al. | 709/224 |
| 6,859,893 B2 * | 2/2005 | Hines | 714/38.11 |
| 6,898,733 B2 | 5/2005 | Parks et al. | |
| 7,013,411 B2 | 3/2006 | Kallela et al. | |
| 7,120,833 B2 | 10/2006 | Kinderman et al. | |
| 7,146,536 B2 | 12/2006 | Bingham, Jr. et al. | |
| 7,162,538 B1 | 1/2007 | Cordova | |
| 7,171,593 B1 | 1/2007 | Whittaker et al. | |
| 7,203,967 B2 | 4/2007 | Chmaytelli et al. | |
| 7,213,176 B2 * | 5/2007 | Banko | 714/38.12 |
| 7,259,666 B1 | 8/2007 | Hermsmeyer et al. | |

(Continued)

FOREIGN PATENT DOCUMENTS

WO  00/74193 A1  12/2000

OTHER PUBLICATIONS

Microsoft TechNet: User and Computer Accounts Jan. 21, 2005 http://technet.microsoft.com/en-us/library/cc759279(WS.10).aspx.*

(Continued)

*Primary Examiner* — Joseph Schell
(74) *Attorney, Agent, or Firm* — Senniger Powers LLP

(57) ABSTRACT

A computerized method for collecting error data and providing error reports relating to occurrences of errors of software applications installed on one or more computing devices is disclosed. Data for describing software applications and identifying software application errors is collected from the computing devices and stored in a catalog. Data associated with error occurrences is obtained and combined with related data being stored in the catalog. A report is generated based on the error occurrences and related catalog data.

20 Claims, 5 Drawing Sheets

U.S. PATENT DOCUMENTS

| | | | |
|---|---|---|---|
| 7,284,165 B2* | 10/2007 | Auvenshine et al. | 714/57 |
| 7,380,177 B2* | 5/2008 | Goin et al. | 714/47.3 |
| 7,428,546 B2 | 9/2008 | Nori et al. | |
| 7,475,293 B1 | 1/2009 | Little et al. | |
| 7,483,898 B2 | 1/2009 | Abdo et al. | |
| 7,555,531 B2 | 6/2009 | Teodosiu et al. | |
| 7,584,220 B2 | 9/2009 | Bozeman et al. | |
| 7,593,943 B2 | 9/2009 | Clarke et al. | |
| 7,702,959 B2 | 4/2010 | Hwang et al. | |
| 2002/0112171 A1 | 8/2002 | Ginter et al. | |
| 2002/0147606 A1 | 10/2002 | Hoffmann et al. | |
| 2002/0162053 A1 | 10/2002 | Os | |
| 2003/0150908 A1* | 8/2003 | Pokorny et al. | 235/375 |
| 2003/0208593 A1* | 11/2003 | Bharati et al. | 709/224 |
| 2004/0054776 A1* | 3/2004 | Klotz et al. | 709/224 |
| 2004/0205399 A1 | 10/2004 | Wang et al. | |
| 2005/0004873 A1 | 1/2005 | Pou et al. | |
| 2005/0034098 A1 | 2/2005 | DeSchryver et al. | |
| 2005/0047350 A1 | 3/2005 | Kantor et al. | |
| 2005/0108173 A1 | 5/2005 | Stefik et al. | |
| 2005/0108677 A1 | 5/2005 | Jain et al. | |
| 2005/0114265 A1 | 5/2005 | Satkunanathan et al. | |
| 2005/0144527 A1* | 6/2005 | Haas et al. | 714/38 |
| 2005/0204200 A1 | 9/2005 | Gadangi et al. | |
| 2005/0289072 A1 | 12/2005 | Sabharwal | |
| 2005/0289401 A1 | 12/2005 | Goin et al. | |
| 2006/0064335 A1 | 3/2006 | Goldszmidt et al. | |
| 2006/0112122 A1 | 5/2006 | Goldszmidt et al. | |
| 2006/0136784 A1* | 6/2006 | Prescott et al. | 714/38 |
| 2007/0055914 A1* | 3/2007 | Chandwani et al. | 714/47 |
| 2007/0094145 A1 | 4/2007 | Ta et al. | |
| 2008/0320486 A1 | 12/2008 | Bose et al. | |

OTHER PUBLICATIONS

Brodie, Mark et al., Quickly Finding Known Software Problems via Automated Symptom Matching, Proceedings of the Second International Conference on Autonomic Computing (ICAC'05), http://ieeexplore.ieee.org/iel5/10030/32175/01498056.pdf?tp=&arnumber=1498056&isnumber=32175, Jun. 2005, 10 pages, IEEE Computer Society.

Ganapathi, Archana et al., Crash Data Collection: A Windows Case Study, http://www.cs.berkeley.edu/~archanag/publications/dsn05_ganapathi.pdf, created on Apr. 1, 2005, 6 pages.

Nakhimovsky, Greg et al, "Enabling User-Controlled Collection of Application Crash Data With DTrace," available at http://developers.sun.com/solaris/articles/app_crash/app_crash.html, May 2005, 10 pages.

Author Unknown, Microsoft System Center Operations Manager 2007, http://download.microsoft.com/download/5/E/F/5EF5C723-A451-471A-B06D-7249B99DC52A/Whitepaper%20-%20Systems%20Center%20Operations%20Manager%202007%20Overview.doc, Jul. 2006, 11 pages.

* cited by examiner

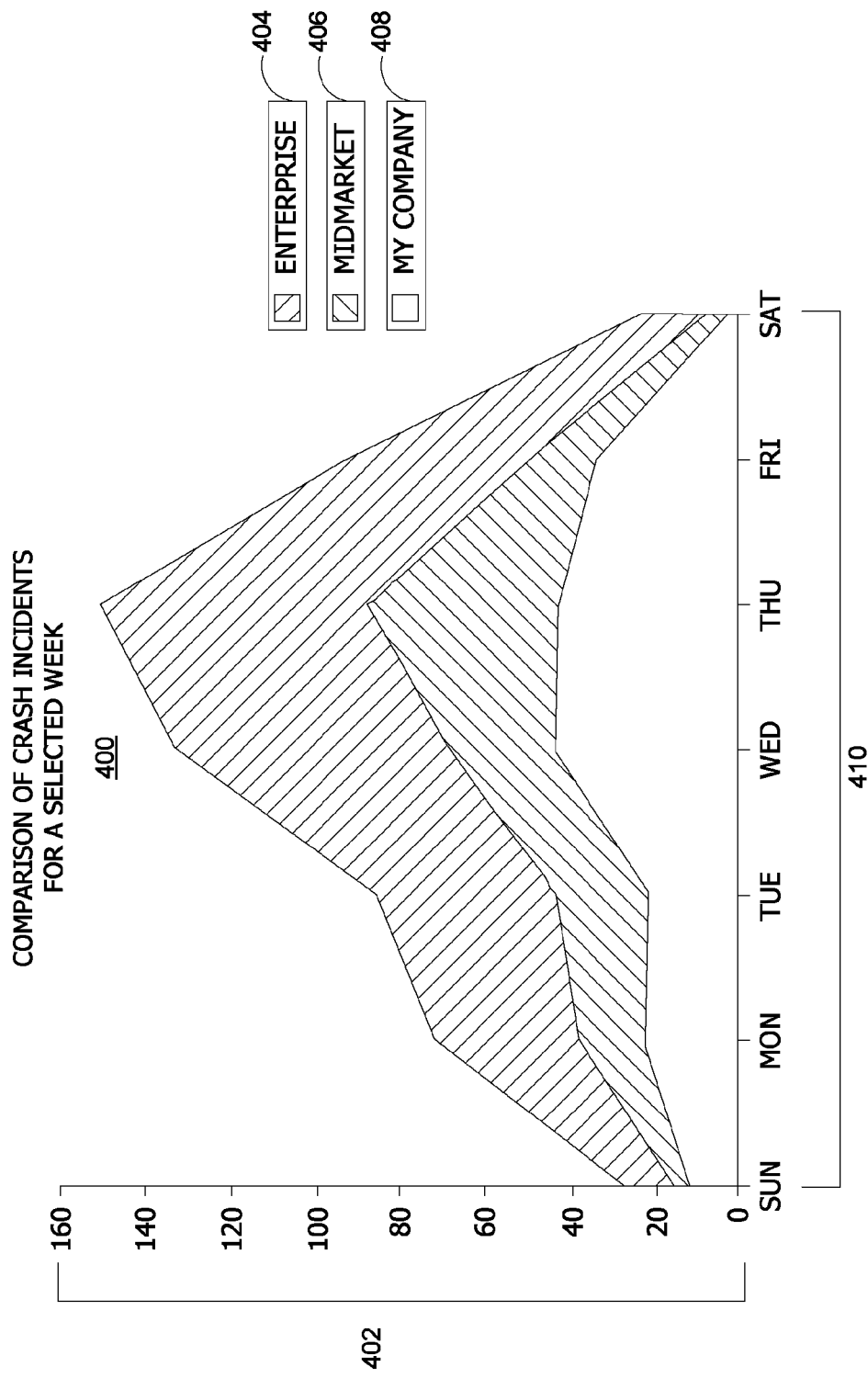

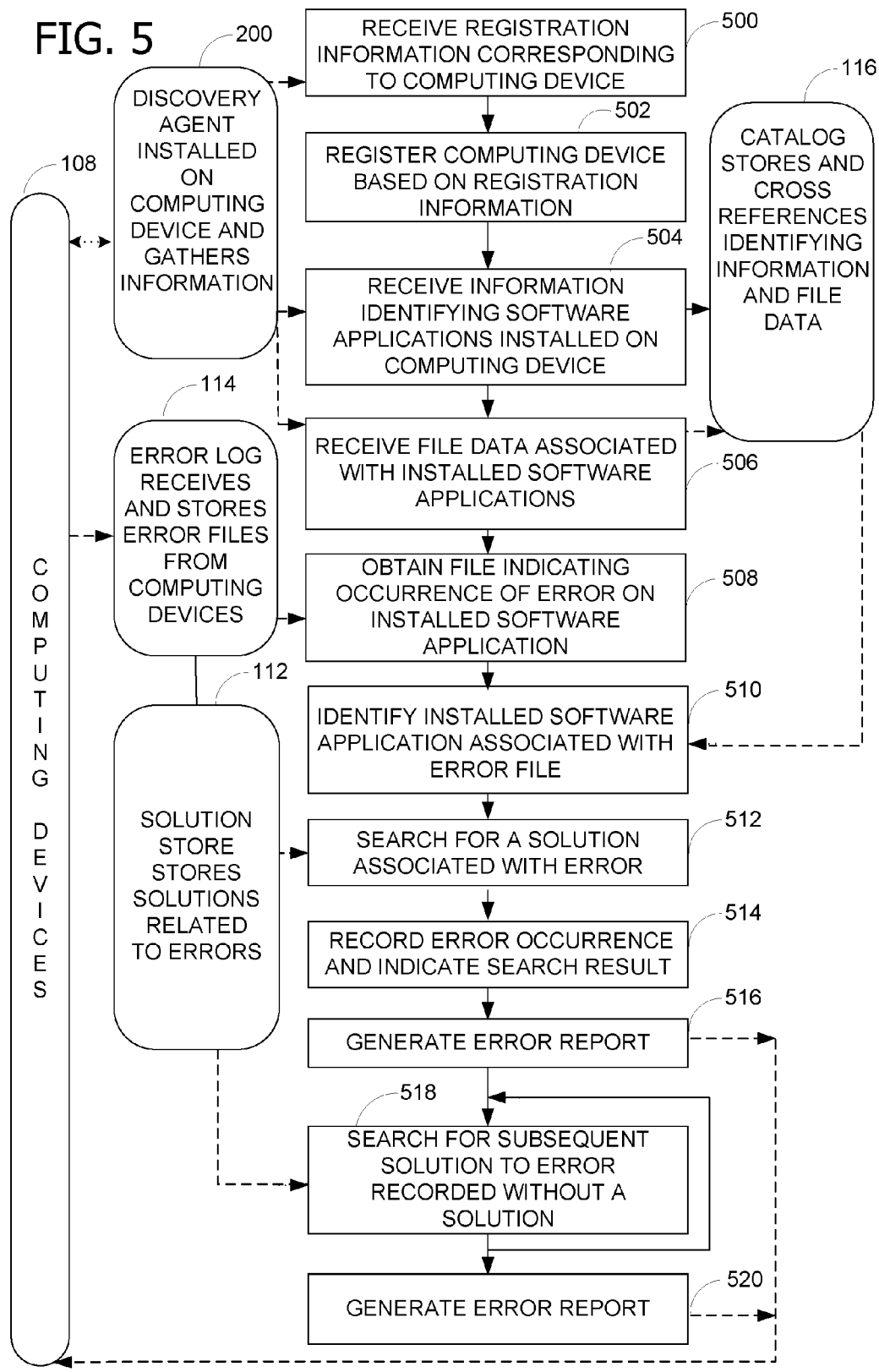

OBJECTIVE ASSESSMENT OF APPLICATION CRASHES FROM A CUSTOMER ENVIRONMENT

CROSS-REFERENCE TO RELATED APPLICATION

This application is a continuation of co-pending U.S. patent application Ser. No. 11/623,267, filed Jan. 15, 2007, entitled "Objective Assessment of Application Crashes from a Customer Environment," the entire disclosures of which are incorporated herein by reference.

BACKGROUND

The present invention generally relates to, in general, to assessing application errors and error symptoms in a computing environment, and in particular, to objectively assessing application errors and error symptoms from a customer computing environment.

As information technology capabilities have increased steadily due to improvements in technology and practices, organizations have grown increasingly reliant on the information technology infrastructure to support critical organization processes and to create new opportunities. One primary business use of information technology often occurs through software applications. Thus, maintaining reliable and available software application is important to supporting efficient business processes and fostering improvements in these processes.

Network administrators typically manage the maintenance and improvement of software application performance for the computing devices on the organization network. Maintaining reliable and available software applications is largely a matter of monitoring the errors and error symptoms, evaluating that against expected norms, and generating work items to troubleshoot and/or improve the errors and error symptoms based on the evaluation.

Because organizations typically have many computing devices having numerous software applications, monitoring the performance can be a difficult task. Many users of computing devices fail to report errors and error symptoms to network administrators. Even when users report errors and error symptoms to network administrators, the reports are often vague or unsure as to what the user was doing or which software applications they were using when an error or error symptom occurs. Thus, obtaining accurate software application error data within an organization network can be especially difficult.

Where accurate error data is collected, evaluating the error data requires understanding the relationship between the data collected and the error that occurred. In many conventional practices, error data is merely reported as a file name which may be meaningless to network administrators or requires research in order to understand the relationship to the error that occurred.

Even where the context of the error data is understood, an evaluation of the error data requires compiling and sorting the data. For a large organization, compiling and sorting error data for the computing devices on the organization network is a large and time consuming task. Moreover, error data collected from a given network, does not provide network administrators with an understanding as to whether the software is performing at a normal level. Such an understanding is achieved with information relating to occurrences of errors and error symptoms in other organizations in the industry and allows organizations to diagnose and assign priority to troubleshooting and improving software application performance.

For example, where a network administrator learns that a particular software application is experiencing large numbers of errors across the organization's network, a comparison of errors occurring with the software application in other organizations in the industry allows a network administrator to determine whether the errors maybe caused by the software application itself or whether they maybe caused by an issue unique to the organization's network. In addition, where a network administrator is considering deploying a software application update or upgrade, accessing error data for the particular software application in other similar organization networks provides the network administrator with insight as to the effect the update or upgrade will have on his organization's network.

Implementing solutions and preventing future software errors and their symptoms is a constant goal for network administrators. In large organizations where many errors are reported, identifying or developing solutions quickly and efficiently can be a challenge for network administrators. While conventional practices aid in identifying selected solutions currently available for a particular error to the user, a significant number of errors are not resolved by these practices. Often, users do not implement the identified solutions because they do not understand how or do not wish to take the time. Additionally or alternatively, many solutions are not developed until after the error occurs and conventional practices fail to identify subsequently developed solutions to users.

SUMMARY

Embodiments of the invention overcome one or more deficiencies of conventional practices related to maintaining available and reliable software applications by collecting and providing meaningful data describing software application errors and compiling and evaluating data relating to errors occurring in a particular organization and across the industry. In addition, embodiments of the invention advantageously identify both solutions available at the time the error occurs and solutions developed after the error occurs. The solutions are reported to the network administrator.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 4 is a graph illustrating an exemplary report comparing the occurrence of errors in a software application installed on a first group of computers to the occurrence of errors in the software application installed on a second group of computers, according to an embodiment of the invention.

FIG. 5 is a flow diagram illustrating collecting error data and providing error reports relating to occurrences of errors of software applications installed on one or more computing devices, according to an embodiment of the invention.

Corresponding reference characters indicate corresponding parts throughout the drawings.

DETAILED DESCRIPTION

Embodiments of the invention conveniently solve the problems of understanding, resolving, and reporting of errors occurring on software applications installed on computing devices in a particular environment. Exemplary embodiments of the present invention improve existing reporting of individual error files by providing diagnostic and solution data which can be compiled and compared for selected users, software applications and related groupings thereof.

Figure 1:
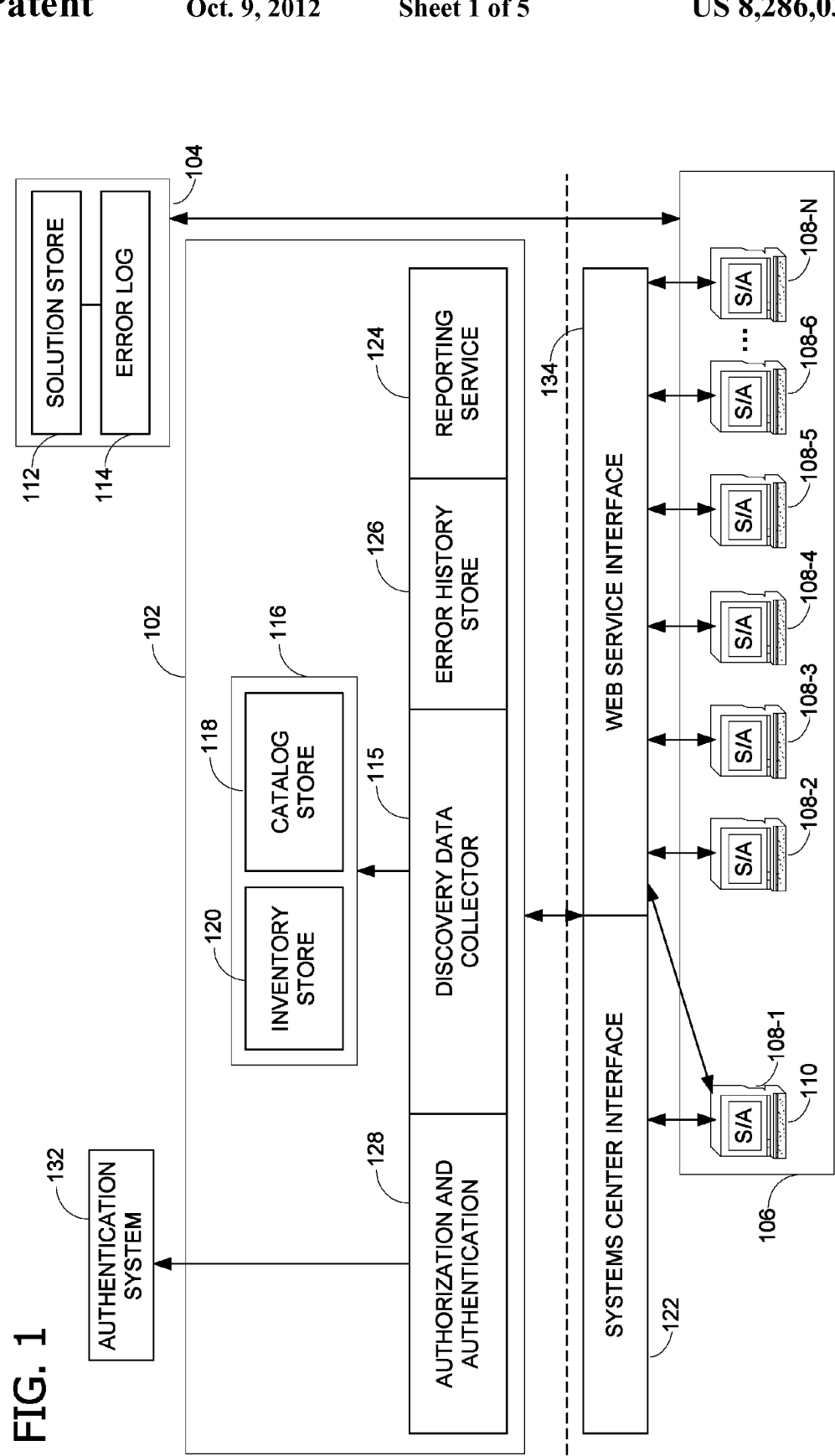
FIG. 1 is a block diagram illustrating an exemplary network environment for collecting error data and providing error reports relating to occurrences of errors of software applications installed on one or more computing devices 108, according to an embodiment of the invention.

Referring now to FIG. 1, a block diagram illustrates an exemplary network environment 100 in which the present invention may be utilized to collect error data and provide error reports. For illustration purposes only and not by limitation, the network environment 100 includes a central management site hereinafter referred to as systems center site 102, an error logging site 104, and a user site 106 having at least one computing device 108. According to one embodiment of the invention, the systems center site 102 includes servers, Internet servers, or other computing devices hosted or managed by an error reporting vendor or a third-party affiliated with the error reporting vendor. Similarly, the error logging site 104 includes servers, Internet servers, or other computing devices hosted or managed by an error logging vendor or a third-party affiliated with the error reporting vendor. Although illustrated as separate sites, it is to be understood that the systems center site 102 and the error logging site 104 may be one site and/or the error reporting vendor and the error logging vendor may be the same entity. In another embodiment of the invention, the user site 106 is not limited to a physical location of a particular user entity. For example, the user site 106 may be an enterprise in which its computing devices 108 span across one or more geographical locations (e.g., different office locations in Seattle, New York, Chicago). According to embodiments of the invention, the systems site obtains error data from the error logging site 104 and generates error reports relating to errors occurring with software applications installed on the computing devices 108 at the user site 106.

Still referring to FIG. 1, the user site 106 includes a plurality of computing devices 108, each with the software application S/A installed thereon. The software application S/A may be any software program, an operating system, and/or a suite of software applications. Exemplary computing devices 108 include one or a combination of the following: a personal computer (PC), a workstation, a cellular phone, a portable digital device, a personal digital assistance (PDA), a pocket PC, a digital media player, and any other digital devices in the user site 106. As is known to those skilled in the art, the computing devices 108 include a combination of the following (not shown): a processing unit, one or more computer-readable media, an internal bus system coupling to various components within the computing devices 108, Input/Output devices, a networking device, and other devices. In one alternative embodiment, computer-readable media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, radio frequency (RF), infrared, and other wireless media, are examples of communication media. Combinations of any of the above are also included within the scope of computer readable media.

The computing devices 108 are coupled to a data communication network. In this embodiment, the computing devices 108 at the user site 106 may be connected to the data communication network via a wired or wired or wireless communication channel. The systems center site 102 and the error logging site 104 are also coupled to the data communication network such that the systems center site 102, the error logging site 104, and the computing devices 108 at the user site 106 can communicate via the data communication network. In this example, the network is the Internet (or the World Wide Web). However the teachings of the present invention can be applied to any data communication network. The computing devices 108 at the user site 106 may be connected via an internal data communication network so that a network administrator 110 has access to the remaining computing devices 108 at the user site 106. Alternatively, the network administrator 110 can access the computing devices 108 via the data communication network.

The error logging site 104 communicates with the computing devices 108 via the data communication network to retrieve error data indicating a file associated with the occurrence of an error of a software application installed on the computing devices 108. As shown in FIG. 1, the error logging site 104 includes a solution store 112. The solution store 112 contains solution data which corresponds to error data retrieved from the computing devices 108. The solution store 112 is maintained by the error logging vendor. Accordingly, the solution data includes information currently or previously known or received by the error logging vendor to diagnose or resolve software application errors currently or previously known or received by the error logging vendor. Upon the occurrence of an error, the computing device generates error data indicating a file associated with the occurrence of the error of a particular one of the installed software applications. The data is presented to a user of the computing device 108 and then communicated to the error logging site 104. The error logging site 104 searches the solution store 112 for solution data corresponding to the error data. The error logging site 104 then communicates the result of the search to the computing device 108.

According to one embodiment of the present invention, the systems center site 102 collects data associated with a particular software application installed on computing devices 108 for providing to the user as a result of an error occurrence of the particular software application. In one embodiment illustrated in FIG. 2, a discovery agent 200 is used to collect data from each of the computing devices 108. The discovery agent 200 may be a collection of computer-executable instructions, computer-executable codes, computer-executable components, a program, or any device that attempts to discover the software applications installed on the computing device 108 and to locate information identifying the installed software applications and file data associated with the installed software applications. For example, the discovery agent 200 discovers a software application installed on computing device 108 and locates the product name and file data used by the software application to indicate the occurrence of an error. In another embodiment, the discovery agent 200 may locate additional descriptive information and file data associated with the installed software application and information associated with the hardware of the computing device 108. Such descriptive information and file data includes any information, including information which is machine-specific, which is known in the art to be associated with the installed software and located on the computing device 108 where the software is installed. In another alternative embodiment, the discovery agent 200 may be configured to locate one or more particular types of descriptive information and/or one or more particular types of file data. In yet another alternative embodiment, the discovery agent 200 may be configured to identify one or more types of software applications.

According to one embodiment, the discovery agent 200 is distributed at the systems center site 102 to the network administrator 110. The network administrator 110 may include any entity with permission to access the systems center site 102 on behalf of other computing devices 108. The discovery agent 200 is thereafter deployed by an administrator(s) 110 at the user site 106. For example, the administrator 110 may receive the discovery agent 200 from the systems center site 102 and subsequently deploy the discovery agent 200 at a later time (e.g., off-peak time) to computing devices 108 at the user site 106. In an alternate embodiment, the discovery agent 200 is deployed to each of the computing devices 108 from the systems center site 102 rather than running continuously as a background process. In one alternative embodiment, the discovery agents 200 identify information based on per-install or per-client access basis. For example, the systems center site 102 may electronically transmit or send the discovery agent 200 to each of the computing devices 108 via the data communications network. As the discovery agent 200 discovers and locates the data associated with the installed software applications, a data discovery collector 115 at the systems center site 102 receives or collects data.

Figure 2:
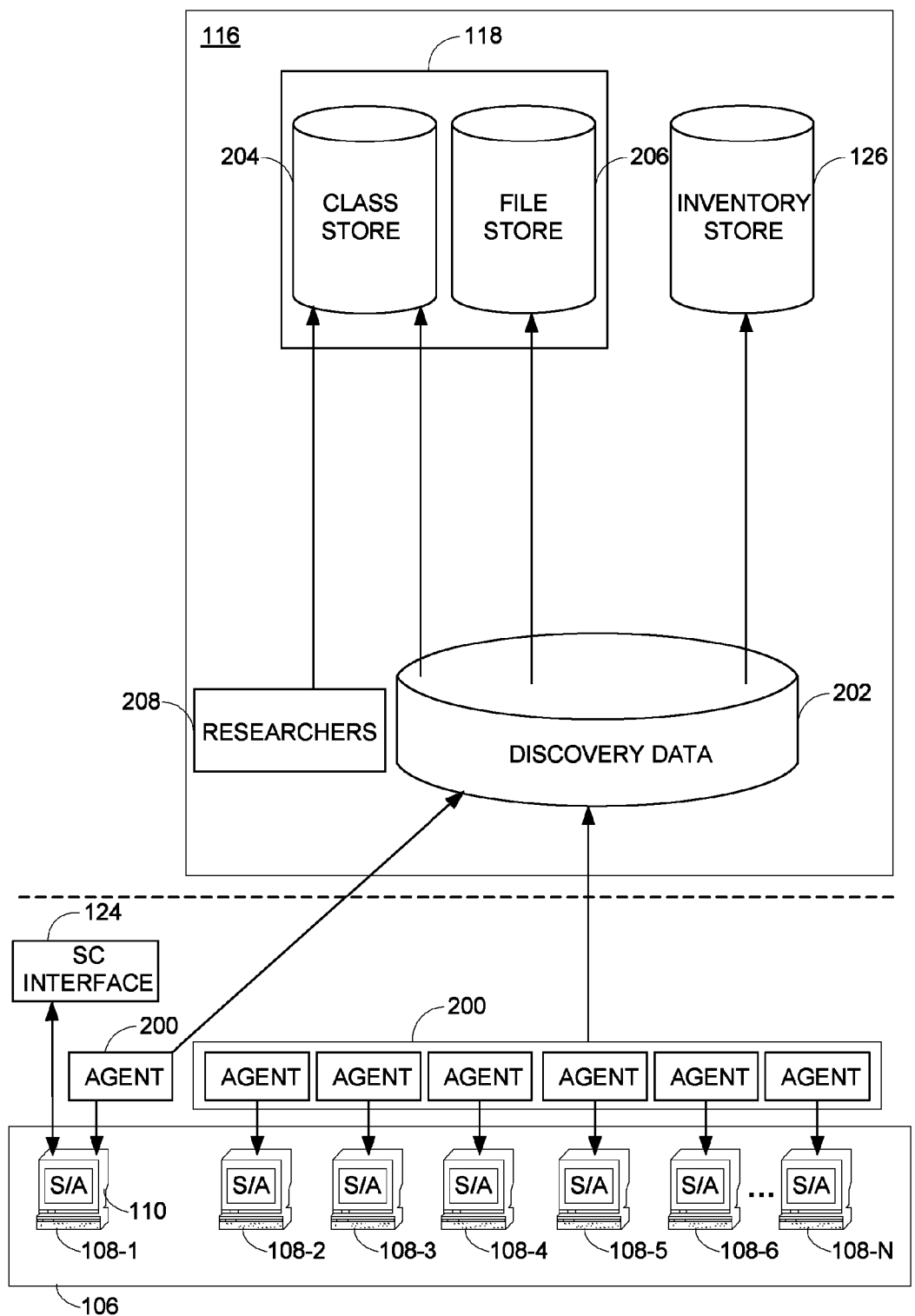
FIG. 2 is a block diagram illustrating discovery agents collecting data for cross-referencing and storing data in a catalog, according to an embodiment of the invention.

According to another embodiment of the present invention illustrated in FIG. 2, the systems center site 102 uses a catalog 116 for storing the collected data 202. Discovery data 202 stored in the catalog may include one or more of the following data types: software application reference data, file reference data, and CPU reference data. In one embodiment, the systems center site 102 includes a catalog store 118 for storing data which is common to multiple computing devices 108 and an inventory store 120 for storing information which is specific to an individual computing device 108. Although illustrated as separate stores in FIGS. 1 and 2, it is to be understood that the catalog store 118 and the inventory store 120 may be embodied by a single data store in an embodiment of the invention. It is also to be understood that the catalog store 118 and inventory store 120 could comprise a data site connected to the data communications network which is independent of the systems center site 102 but accessible by the systems center site 102.

The catalog store 118 may include a class store 204 and a file store 206. The class store 204 is defined by software application reference data collected by the discovery data collector 115 including one or more of the following relating to an installed software application: software category, application identifier, product name, product version, product manufacturer application description, language supported by application, and/or product support information. The file store 206 is defined by file reference data collected by the discovery data collector 115 including various attributes of files (e.g., executable and/or reference files relating to a software application) located by the discovery agent 200. According to another embodiment, for each file which the data collector 115 collects file reference data, a "finger-print" will be generated (e.g., a hash of the various attributes of the file) and used to resolve duplications of file entries.

According to another embodiment of the present invention, the systems center site 102 uses the catalog 116 for cross referencing the collected data 202. The catalog 116 includes mapping data which is used to cross-reference or associate related data being stored in the catalog 116. For example, the catalog 116 includes file mapping reference data which is a mapping table that associates class data (e.g., software application reference data) with file data (e.g., file reference data). It is to be understood that collected data 202 may be organized for storage and cross-referenced according to alternate various parameters associated with the collected data 202 without departing from the scope of the invention. It is also to be understood that collected data 202 may be organized for storage and cross-referenced according to additional various parameters associated with the collected data 202 without departing from the scope of the invention. For example, the class data could be further grouped and categorized according to software application reference data parameters (e.g., name and manufacturer of software application).

According to another embodiment of the present invention, the systems center site 102 uses the catalog 116 for storing additionally acquired descriptive information and cross referencing the additionally acquired descriptive information to existing data in the catalog 116 associated with the installed software applications. In one embodiment, researchers 208 provide data in addition to the data collected 202 by the discovery data collector 115. The researched data may be provided to the catalog 116 manually and automatically. The data may be cross-referenced with existing data in the catalog 116 by manually adding it to a particular class store 204. The data may also be cross-referenced with existing data in the catalog 116 according to the mapping data previously discussed. The researched data may include software product reference data, file reference data, CPU reference data and/or an additional data type. Researched software product reference data may include any one or more of the following: application version name, application family, application suite, application edition, required memory size, required disk size, required number of processors and processor family, and/or supported operating system. Additionally, researched data may include solutions for errors occurring in the cross referenced data associated with the software applications. In an alternate embodiment, descriptive data stored by the catalog 116 includes researched data wherein researched data includes data collected 202 by a discovery agent 200. In another alternate embodiment, descriptive data stored by the catalog 116 includes researched data the additional descriptive information is acquired using a discovery agent 200.

According to another embodiment of the present invention, the systems center site 102 obtains error data indicating a file associated with the occurrence of an error of a particular one of the installed software applications. As illustrated by FIG. 1, the systems center site 102 accesses via the data communication network the error data logged by the error logging site 104. Additionally or alternatively, the discovery agent 200 discovers error data on the computing devices 108 and the systems center site 102 obtains the error discovered by the discovery agent 200. In this manner, the systems center site 102 tracks the occurrences of errors on software applications installed on each of the computing devices 108. In one embodiment, the systems center site 102 is configured to obtain error data relating to the occurrence of errors of software applications installed on particular computing devices 108 (e.g., selected or registered computing devices 108) based on error data logged by the error logging site 104. Additionally or alternatively in another embodiment, the systems center site 102 is configured to obtain error data relating to the occurrence of errors on particular software applications based on error data logged by the error logging site 104.

According to one embodiment, the systems center site 102 searches the solution store 112 for a solution associated with the error indicated by the error data. In another embodiment, the error logging site 104 searches the solution store 112 for a solution information associated with the error indicated by the error data. The error logging site 104 stores the solution information so that the error data obtained from the error logging site 104 includes solution information associated with the error indicated by the error data.

According to another embodiment of the present invention, the systems center site 102 includes a reporting service 124 which generates an error report based on the data obtained from the error logging site 104 and data stored in the catalog 116. In one embodiment, a file indicating an error occurrence obtained from the error logging site 104 is used by the reporting service 124 to identify the installed software application associated with the error. For example, the reporting service 124 queries the file store 206 for a particular file obtained from the error logging site 104 indicating an error occurring in the installed software application. The reporting service 124 maps the file resulting from the query to software application data. The mapped software application data identifies the software application and may contain additional descriptive information about the software application. The reporting service 124 then generates a report to provide the descriptive information and error data to a user via an interface 122. According to embodiments of the invention, the report may be transmitted from the systems center site 102 to the user site 106 via a web page, an electronic mail, messaging system, or other means of communications (e.g., facsimile). The interface may include 122 a website or a common data communication network.

Figure 3:
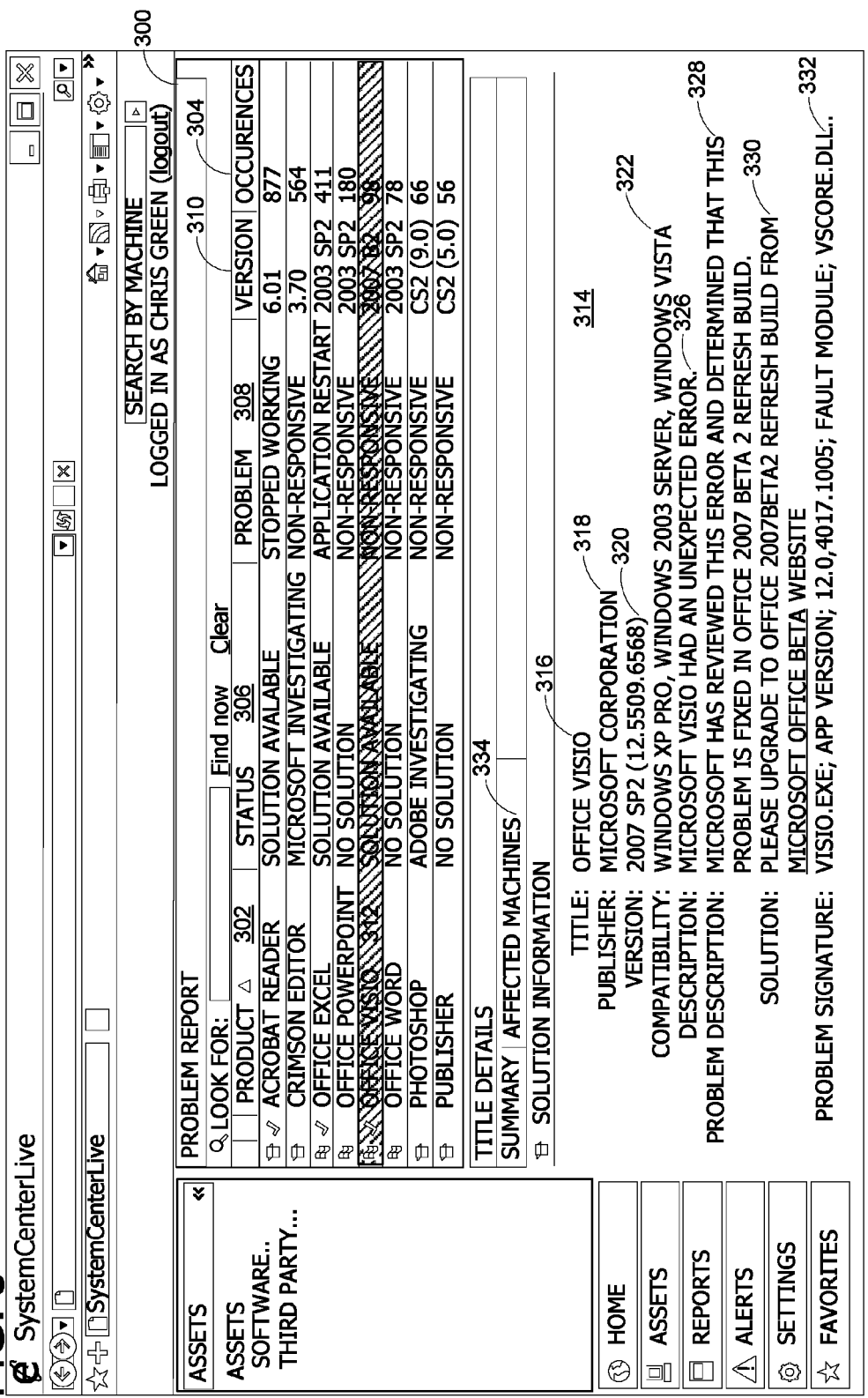
FIG. 3 is a drawing of a screen shot illustrating an exemplary report provided to a user through a user interface on a computing device summarizing occurrences of errors of software applications installed on one or more computing devices, according to an embodiment of the invention.

FIG. 3 illustrates an exemplary report including the descriptive information and error data generated according to an embodiment of the invention. In one embodiment, the discovery agent 200 is used to collect information for one or more software applications installed on selected computing devices 108 at the user site 106. For example, the discovery agent 200 is distributed to the network administrator 110 and the network administrator 110 selects computing devices 108 at the user site 106 and deploys the discovery agent 200 on the selected computing devices 108. The discovery agent identifies an installed software application, such as a drawing and diagramming software application (e.g., Visio®), and locates the related files data (e.g., Visio.exe) and descriptive information (e.g., the name of the publisher, the version, and compatibility information). This data is collected and the file data is stored in the file store 206 and is cross referenced to the descriptive information which is stored in the catalog store 118. A researcher determines additional information relating to the error file (e.g., Visio.exe file indicates that Microsoft Visio software had an unexpected error). The researcher stores this description in the catalog and cross references it to the Visio.exe. file data. The reporting service 124 obtains error data for the selected computing devices 108 from the error logging site 104 which contains the Visio.exe file. The reporting service 124 queries the file store 206 for each of the files including the Visio.exe file. The Visio.exe file is located and the cross referenced data in the catalog 116 is identified e.g., the name of the publisher, the version, compatibility information, and the description. The reporting service 124 also queries the solution store to identify solution information (e.g., a solution and problem description) associated with the files obtained in the error data. The reporting service 124 then compiles the data and generates a report.

For example, the report 300 shows one or more software applications 302 installed on the selected computing devices 108 at the user site 106. For each of the one or more software applications 302 the report shows the number of errors 304 which occurred on the software application 302 installed on the selected computing devices 108, the solution status 306, the problem 308 the error caused to the software application 302, and the version 310 of the software application 302. The report service allows the user to perform various operations (e.g., sort, select, filter, query, and/or search) with respect to the information provided in the report 300 to further customize the report. For a selected application 312, the report provides additional descriptive details 314 regarding the software application 312 and the error data. For the drawing and diagramming software named "Office Visio" 312, the report 300 describes the title 316, publisher 318, version 320, compatibility information 322, and a description of the latest error 326 identified from the catalog 116. Additionally, the report provides the description of the problem 328 and the available solution 330 identified from the solution store. The error data is described in a problem signature 332. For a selected application, the report 300 also provides details 334 regarding the computing device 108 on which the selected software application 312 errors occurred.

FIG. 4 illustrates a comparative exemplary report including the descriptive information and error data generated according to an embodiment of the invention. In one embodiment, the discovery agent 200 is used to collect information related to one or more software applications installed on selected computing devices 108 at multiple user sites 106. For example, a network administrator 110 at user site 106 registers for the services offered by the systems center site 102. The authentication and authorization service 128 illustrated in FIG. 1 identifies the user (e.g., the particular entity or organization associated with the user site 106) of the computing device 108. Particularly, the user may be identified by receiving login information from the user and authenticating the user based on the received login information. The user may be authenticated using a presently available multi-site user authentication system 132. As part of the authentication process, a unique identifier is associated with the user. The discovery agent 200 is distributed to the network administrator 110 at each user site 106 and the network administrator 110 selects computing devices 108 at the user site 106 and deploys the discovery agent 200 on the selected computing devices 108. The discovery agent 200 registers each of the selected computing devices 108 with the systems center site 102 and associates the registered computing devices 108 with the unique identifier of the related user. The unique identifier will be included in any data, including error data and discovery data, transmitted from the registered computing devices 108 to the systems center site 102 such that it is associated with the transmitted data stored by the systems center site 102. The systems center site 102 may associate additional information with the unique identifier which is related to the user (e.g., industry of the user, number of computing devices related to the user).

The systems center site 102 displays various criteria for generating customized reports. The criteria may include any one or more of the data parameters obtained by the systems center site 102 associated with the user, computing devices 108, installed software applications, and error data. The report 400 illustrated in FIG. 4 is generated by an identified user selecting a software application (e.g., Microsoft Office 2003 SP3 Beta), a time frame (e.g., last week), and two categories of users (e.g., midmarket and enterprise). Based on the selected criteria, the reporting service 124 obtains error data from the error logging site 104 and queries the data stored in the catalog 116. The reporting service 124 then compiles the data and generates a report 400 comparing the number of errors occurring 402 with the selected software application, Microsoft Office 2003 SP3 Beta, on registered computing devices 108 associated with enterprise 404 and midmarket 406 users to the number of errors occurring with the selected software application, Microsoft Office 2003 SP3 Beta, on registered computing devices 108 associated with the identified user, My Company 408, over the course of the last week 410.

According to another embodiment of the present invention, the systems center site 102 records selected error data obtained from the error logging site 104 or the discovery agent 200 in the error history store 126. For a recorded error for which a solution was not found either in the descriptive data or as a result of searching the solution store 112, the systems center site 102 continues to search for a solution associated with the error. The systems center site 102 searches at a selected frequency (e.g., once a day) for a time period beginning upon generating the error report reporting the error and ending upon finding a solution or expiration of a pre-selected time period (e.g., 3 months), wherein the expiration of the time period occurs prior in time to finding the solution. The reporting service 124 generates another error report based on the results of the search at the end of the time period. In other embodiments, the systems center site 102 can be configured to continue searching based on any of the parameters for which the systems center site 102 obtains data. For example, the user can select using the interface 122 that the systems center site 102 continues searching for solutions only for a particular family of software applications.

The flow diagram in FIG. 5, illustrates collecting error data and providing error reports relating to occurrences of errors of software applications installed on one or more computing devices 108, according to an embodiment of the invention. At 500, the systems center site receives registration information from a user desiring the reporting services offered by the systems center site. The registration information includes information corresponding to the users computing device 110.

At 502, the systems center registers the computing device 110 based on the registration information provided by the user. The registration may include identifying the user. For example, the user may be identified by receiving login information from the user and authenticating the user by based on the received login information. As part of the authentication process, a unique identifier is associated with the user. The systems center site 102 then distributes a discovery agent 200 to the user's computing device 110 and the discovery agent 200 is downloaded on the user's computing device 110. The discovery agent 200 may be customized for the user based on the registration information provided by the user. The discovery agent 200 is deployed or downloaded to selected computing devices 108 at the user's site and installed on the selected computing devices 108. During the installation, the discovery agent 200 associates the computing device with identity of the user (e.g., the unique identifier) and provides registration information received by the systems center site 102. The installed discovery agent 200 gathers information on the computing device 108 including discovering installed software applications and locating descriptive information and file data associated with the installed software applications.

At 504, the discovery data collector 115 receives the information gathered by the discovery agent 200. The gathered and received information includes information identifying software applications installed on the registered computing devices 108. Likewise, at 506 the discovery data collector 115 receives the information gathered by the discovery agent 200. The gathered and received information includes file data associated with software applications installed on the registered computing devices 108. Particularly, the file data includes files indicating the occurrence of an error with the software application. The information received at 504 is cross referenced with the information received at 506 and stored in the catalog 116.

At 508, the systems center site 102 obtains from the error log 114 error data indicating a file associated with the occurrence of an error on particular one of the installed software applications. The error data obtained may include data associated with multiple users and/or registered computing devices 108. The error data obtained may be limited to include data associated with particular errors and/or data associated with errors occurring in particular time periods. In an alternate operation, prior to step 14, step 510 is repeated to obtain additional error data for tracking the occurrences of errors on the software applications.

At 510, the systems center site 102 uses the catalog 116 to identify the installed software application associated with an error file. The systems center site 102 may also identify selected data associated by the catalog 116 with the installed software application.

At 512, the systems center site 102 searches the solution store 112 for a solution associated with the error data obtained. In an alternate operation, the error logging site 104 accesses the solution store 112 for solutions related to the received error files. Where a solution is identified in the solution store 112, the error logging site 104 includes the solution information in the error data recorded in the error log. In another alternate operation, the solution information is added to the catalog 116 and cross referenced to the corresponding file.

At 514, the systems center site 102 records the error occurrence and indicates whether additional searching for a solution is required.

At 516, the reporting service 124 generates a report based on the information identified at 510 and the tracked occurrence of errors. The systems center site 102 provides reports to the user's computing device summarizing the errors of the registered computing devices 108 associated with the user. The reports can be customized by users based on criteria known (e.g., received, obtained, collected, accessed, and/or tracked) by the systems center site 102.

At 518, the systems center site 102 searches the solution store 112 for a solution added subsequent to the search at 512 corresponding to a recorded error indicating no identified solution. If no subsequent solution is identified, the systems center site 102 repeats step 518 periodically until a solution is identified. The solution may also be discontinued manually or automatically (e.g., after a specified period of time). At 520, the systems center site 102 generates a report indicating the solution identified. The order of execution or performance of the operations in embodiments of the invention illustrated and described herein is not essential, unless otherwise specified.

That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computerized method for collecting error data and providing error reports relating to occurrences of errors of software applications installed on a plurality of selected computing devices, said computerized method comprising:
   receiving registration information from each of a plurality of selected computing devices having software applications installed thereon;
   registering each of the selected computing devices based on the received registration information;
   tracking error data for each of the software applications installed on each of the registered computing devices, said error data relating to the occurrences of errors in said software applications, said error data including a file name of a file belonging to the software application in which each error occurred and an identifier of the user of the registered computing device when the error occurred;
   receiving user-selected reporting criteria, said user-selected reporting criteria including a user-selected particular user and a user-selected software application, wherein the user-selected software application is a software application installed on at least one of the registered computing devices; and
   generating an error report as a function of the user-selected reporting criteria, said error report identifying a total number of occurrences on the plurality of selected computing devices of errors for the user-selected particular user for the user-selected software application based on the file names and the user identifiers in the tracked error data.

2. The computerized method of claim 1 wherein the registration information includes information about the software and hardware of the selected computing device, said information including file names of files belonging to software application products installed on said selected computing device.

3. The computerized method of claim 2 further comprising creating a catalog including descriptive information for software application products cross referenced with the software and hardware information provided during registration of the selected computing device and with the tracked occurrences of errors in each of the software applications installed on the selected computing device.

4. The computerized method of claim 3 wherein tracking the occurrences of errors in each of the software applications installed on each of the registered computing devices comprises receiving error data including a file name of a file belonging to the software application in an error occurred, and wherein the descriptive information is cross referenced in the catalog to the error data based on the file name.

5. The computerized method of claim 1 further comprising identifying a user of a computing device.

6. The computerized method of claim 5 wherein identifying a user includes receiving login information from the user and authenticating the user based on the received login information wherein authenticating the user comprises associating a unique identifier with the user.

7. The computerized method of claim 6 further comprising associating the unique identifier associated with the identified user to the registered computing devices.

8. The computerized method of claim 5 wherein the identified user and one or more certain registered computing devices are associated with a particular organization.

9. The computerized method of claim 8 further comprising identifying a second user of a second computing device wherein said second identified user and second one or more registered computing devices are associated with a second organization and wherein the generated error report identifies a total number of occurrences of errors during the user-selected time period for the user-selected software application installed on the certain registered one or more computing devices associated with the particular organization and identifies a total number of occurrences of errors during the user-selected time period for the user-selected software application installed on the second one or more registered computing devices associated with the second organization.

10. A system comprising:
    a processor configured to receive registration information from each of a plurality of selected computing devices, said registration information including information about the software and hardware of the selected computing device, said information including file names of files belonging to software application products installed on said selected computing device; and
    a memory area for storing a catalog, said catalog including the registration information received from each of the plurality of selected computing devices;
    wherein the processor is further configured to track error data relating to the occurrences of errors in each of the software applications installed on each of the registered computing devices, said error data including a file name of a file belonging to the software application in which each error occurred and an identifier of the user of the computing device when the error occurred, said processor being further configured to receive user-selected reporting criteria, and to generate an error report, said user-selected reporting criteria including a user-selected particular user and a user-selected software application, wherein the user-selected software application is a software application installed on at least one of the selected computing devices, said error report identifying a total number of occurrences on the plurality of selected computing devices of errors for the user-selected particular user for the user-selected software application based on the filenames and user identifiers in the tracked error data.

11. The system of claim 10 wherein the catalog includes descriptive information for software application products cross referenced with the software and hardware information provided during registration about the computing device and with the tracked occurrences of errors the software applications installed on each of the registered computing devices.

12. The system of claim 10 wherein the processor is further configured to identify a user of a computing device.

13. The system of claim 12 wherein identifying a user includes receiving login information from the user and authenticating the user based on the received login information wherein authenticating the user comprises associating a unique identifier with the user.

14. The system of claim 13 further comprising associating the unique identifier associated with the identified user to the registered computing devices.

15. The system of claim 12 wherein the identified user and one or more certain registered computing devices are associated with a particular organization.

16. The system of claim 15 wherein the processor is further configured to identify a second user of a second computing device wherein said second identified user and second one or more registered computing devices are associated with a second organization and wherein the generated error report identifies a total number of occurrences of errors during the user-selected time period for the user-selected software application installed on the certain registered one or more computing devices associated with the particular organization and identifies a total number of occurrences of errors during the user-selected time period for the user-selected software application installed on the second one or more registered computing devices associated with the second organization.

17. A computerized method of collecting error data and providing error reports relating to occurrences of errors of software applications installed a plurality of computing devices connected to a data communication network, said computerized method comprising:
    obtaining error data from a plurality of computing devices, said error data relating to the occurrence of errors in software applications installed on the plurality of computing devices, wherein for each occurrence of an error, the error data includes a file name of a file belonging to the software application in which the error occurred and the identifier of the user of the computing device when the error occurred;
    receiving a request from a particular computing device for an error report for a particular user; and
    providing a report to the requesting particular computing device that summarizes errors associated with the particular user that occurred cumulatively across the plurality of computing devices based on the file name, included in the error data, of the file belonging to the software application in which the error occurred and based on the identifier of the user of the computing device when the error occurred.

18. The computerized method of claim 17 further comprising, for each of the plurality of computing devices, receiving information about the software and hardware of the computing device, said information including file names of files belonging to software application products installed on said computing device.

19. The computerized method of claim 18 further comprising creating a catalog including descriptive information for software application products cross referenced with the software and hardware information provided during registration about the computing device and with the error data relating to the occurrence of errors of the software applications installed on the computing device.

20. The computerized method of claim 19 wherein the descriptive information is cross referenced in the catalog to the error data based on the file name, included in said error data, of the file belonging to the software application in which the error occurred.

* * * * *